June 17, 1969

D. R. EAVES ET AL 3,449,985

MACHINE TOOLS

Filed June 25, 1965

INVENTORS
D.R. EAVES, H. BERGEMANN &
W.G.G. BISHOP

BY

ATTORNEYS

INVENTORS
D. R. EAVES, H. BERGEMANN &
W. G. G. BISHOP

ATTORNEYS

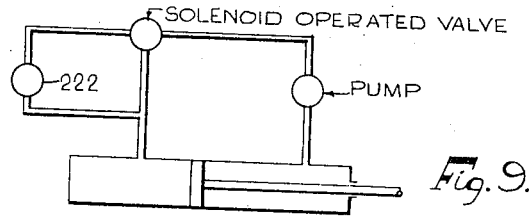
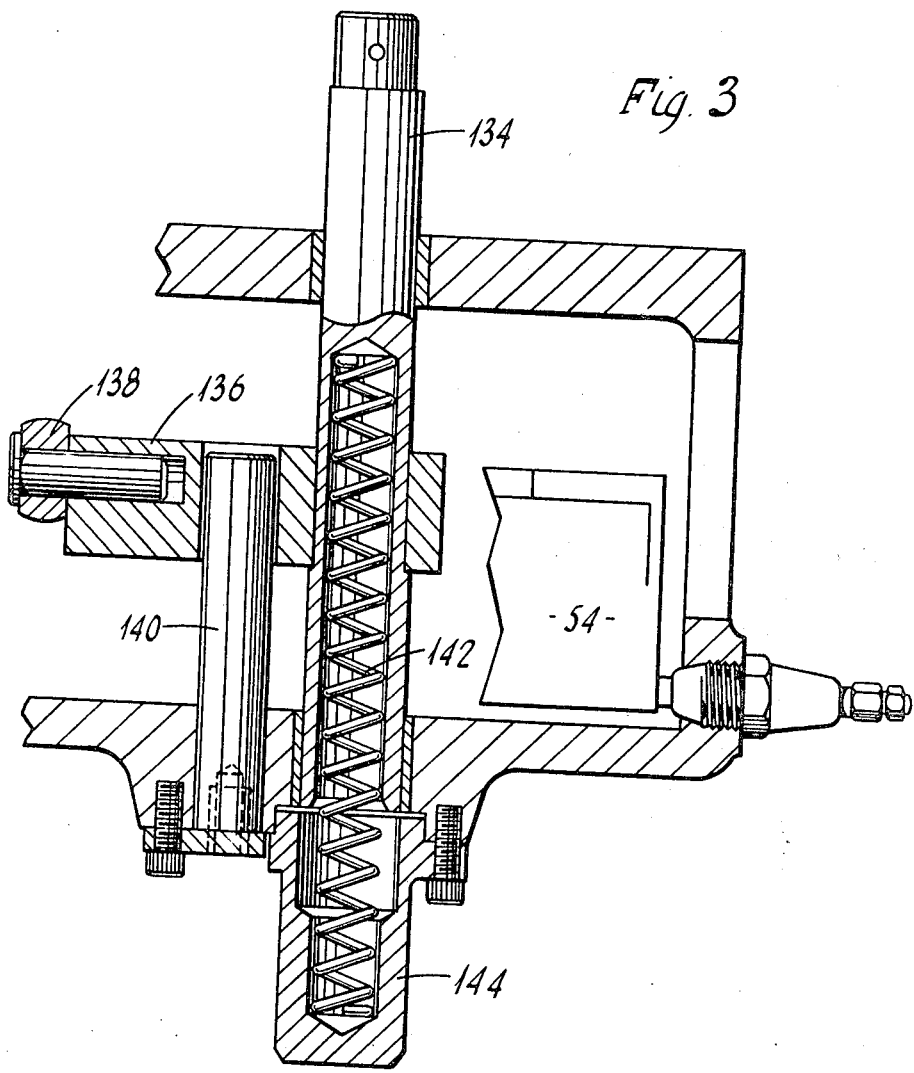

INVENTORS
D.R. EAVES, H. BERGEMANN &
W.G.G. BISHOP

June 17, 1969 D. R. EAVES ET AL 3,449,985
MACHINE TOOLS

Filed June 25, 1965

INVENTORS
D.R. EAVES, H. BERGEMANN &
W.G.G. BISHOP

BY
ATTORNEYS

United States Patent Office 3,449,985
Patented June 17, 1969

3,449,985
MACHINE TOOLS
Dennis Robert Eaves, Bournemouth, Horst Bergemann, Christchurch, and William Gordon Groves Bishop, Bournemouth, England, assignors to Eaves, Bishop & Sons Limited, Christchurch, Hampshire, England, a British company
Filed June 25, 1965, Ser. No. 555,209
Int. Cl. B23b 39/20, 39/10, 47/18
U.S. Cl. 77—25
2 Claims

ABSTRACT OF THE DISCLOSURE

A machine tool which includes a horizontally reciprocable turret indexable about a vertical axis, the turret carrying a plurality of selectively driven tool-receiving spindles. The distance and rate of advance of the slide can be controlled for each indexed position of the turret and the means controlling the rate of advance of the slide includes a separate hydraulic flow valve for each spindle. The flow valves are contained in a valve block having a distributor shaft which is indexed in accordance with indexing movements of the turret.

---

This invention relates to machine tools of the kind which include an indexable turret having a plurality of tool receiving spindles which are adapted to be driven successively when indexed into an operative position.

It is an object of the present invention to provide an improved form of such a machine tool which includes an improved form of turret indexing mechanism.

It is a further object of the invention to provide improved means for controlling the rate of advance of the turret for each indexed position thereof, the turret being carried by a slide which is movable along a slideway and a hydraulic piston and cylinder mechanism being provided for effecting reciprocable movement of the slide along the slideway.

It is a further object of the invention to provide a machine tool which includes interchangeable spindles.

It is a further object of the invention to provide improved means for controlling the distance of advance of the turret for each indexed position thereof.

Figure 1:
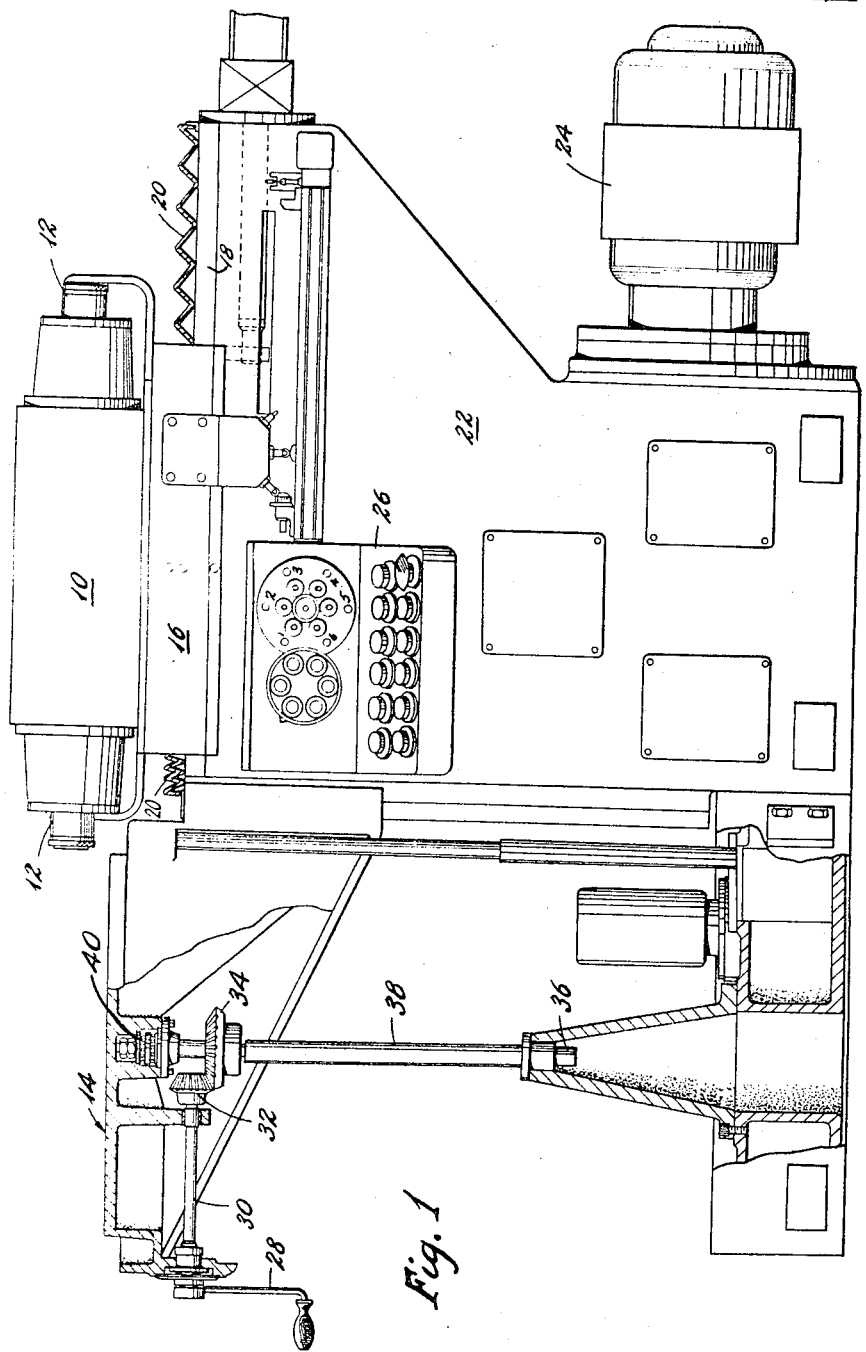
Figure 2:
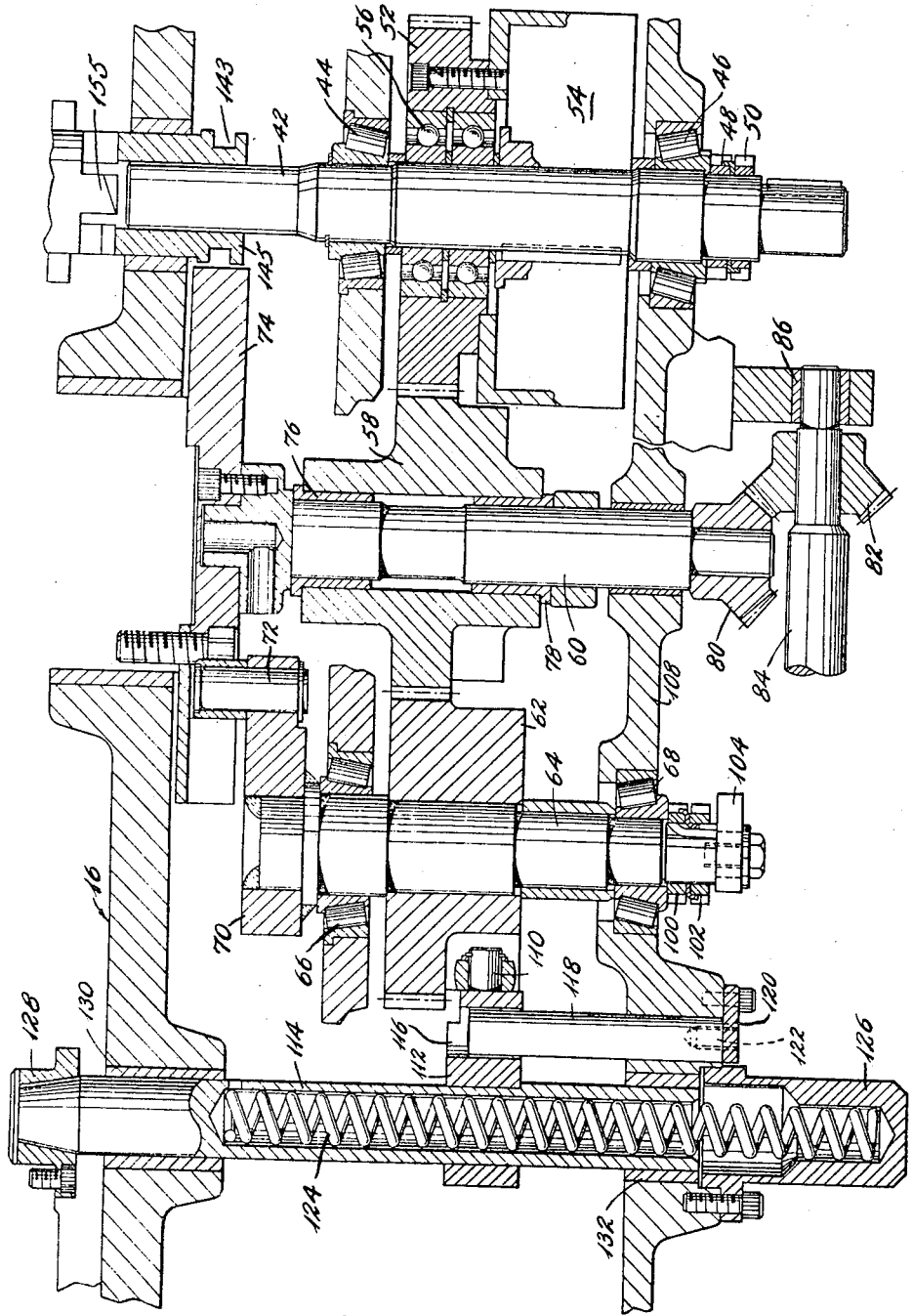
Figure 4:
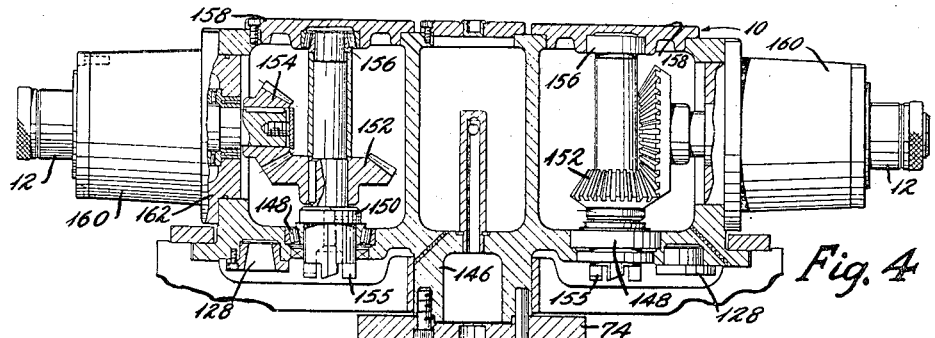
Figure 5:
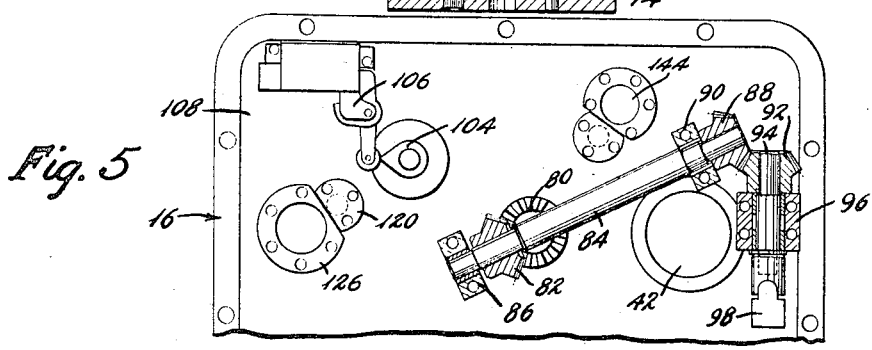
Figure 6:
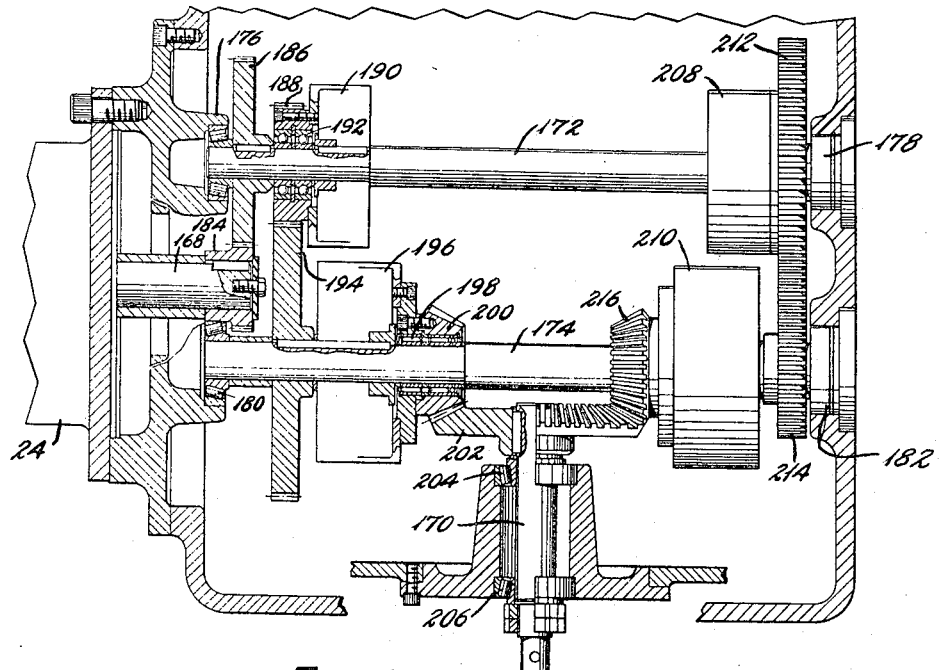
Figure 7:
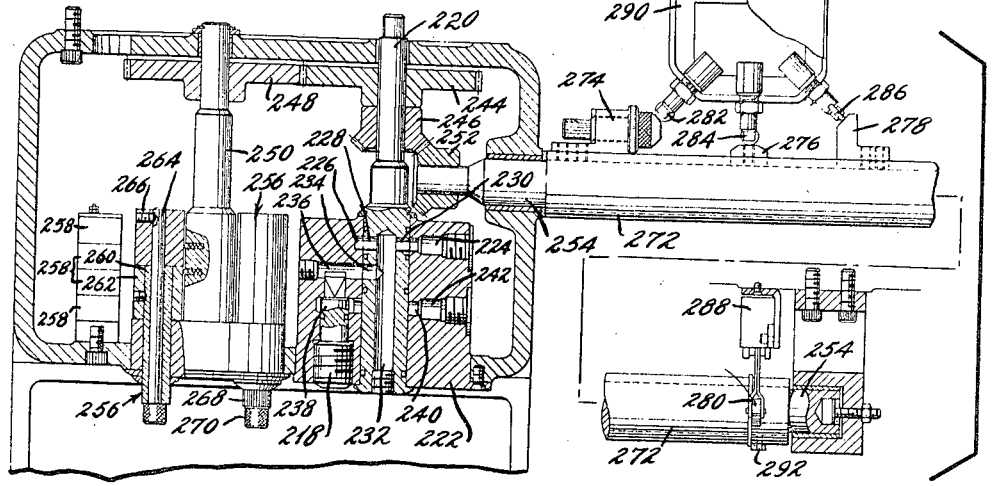
Figure 8:
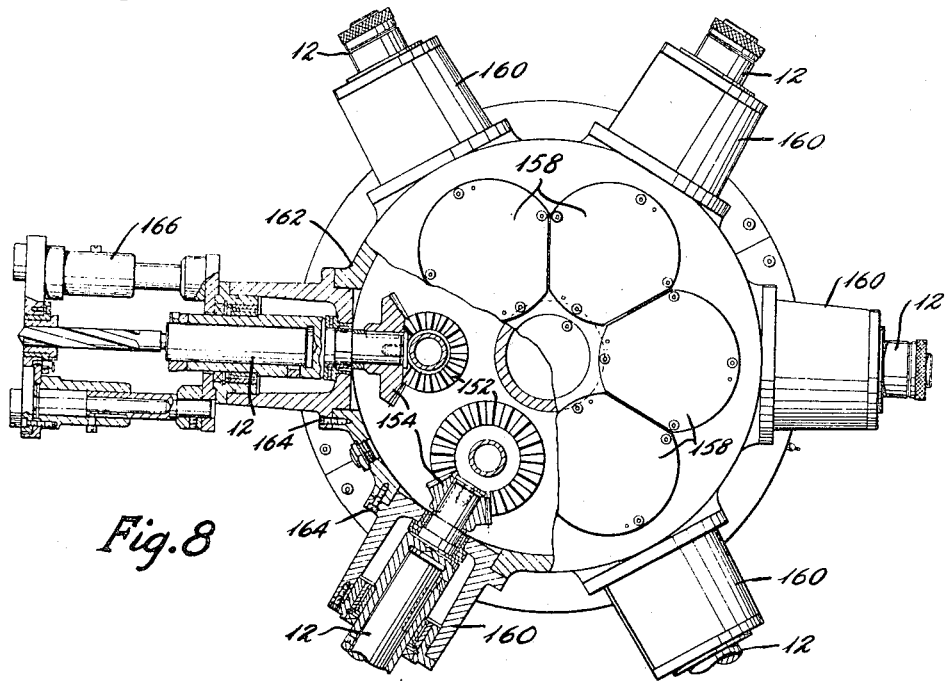

The invention will now be described by way of example with reference to the accompanying drawings in which:

FIGURE 1 is a side view, partly in section, of the machine tool,

FIGURE 2 is a sectional view showing the drive means to the turret and the turret indexing mechanism contained within the turret slide, FIGURE 3 is a fragmentary section showing part of the turret indexing mechanism within the turret slide, FIGURE 4 is a part sectional view of the turret, FIGURE 5 is an underneath plan view of the turret slide, FIGURE 6 is a part sectional view showing the machine tool drive means and change speed mechanism, FIGURE 7 is a part sectional view of the mechanism for controlling the rate and distance of advance of the turret, FIGURE 8 is a part sectional plan view of the turret, and FIGURE 9 is a diagrammatic representation of the hydraulic circuit of the machine tool.

Referring firstly to FIGURE 1 of the drawings the machine tool includes a turret 10 having a plurality of spindles 12 which are adapted to be driven when brought into operative relationship with a work table 14. The turret 10 is mounted upon a slide 16 and is adapted to be indexed about a vertical axis with respect to the slide 16. The slide 16 is movable along a slideway 18 and a corrugated cover 20 is disposed on either side of the slide 16 to prevent loss of lubricant from the slideway 18 and entry of dust and dirt into the slideway 18.

The machine tool includes a base 22 which includes the drive means to the slide 16 and the drive is obtained from an electric motor 24. The various operations of the machine tool are controlled through a control panel 26, which enables the operator to select the rate of advance of the turret 10 when a particular spindle 12 is in the operative position, to select the rate of rotation of the spindle 12 either in a reverse or forward direction and to limit the distance of advance and retraction of the turret 10 on the slide 16.

The work table 14 has a handle for raising or lowering the table and upon rotating the handle 28 a shaft 30 is rotated. A gear wheel 32 is mounted on shaft 30 and this gear wheel 32 is in mesh with a second gear wheel 34 on a vertical shaft 36 which passes through a guide tube 38. The vertical shaft 36 is externally screw-threaded and the guide tube 38 is internally screw-threaded, the vertical shaft engages in a bearing 40 adjacent the working surface of the tube 14 so that upon rotation of the handle 28, the shaft 36 and hence the work table 14 is moved either upwardly or downwardly.

As shown in FIGURE 2 the machine tool slide 16 contains a main drive shaft 42 which is adapted to transmit drive to one of the spindles 12 when the spindle is in register with the work table 14. This main drive shaft 42 is constantly rotated in either a forward or reverse direction when the electric motor 24 is operated and is supported in a pair of bearing assemblies 44 and 46. Bearing assembly 44 is such as to prevent downward movement of the drive shaft 42 and bearing assembly 46 is such as to prevent upward movement of the drive shaft 42, bearing assembly 46 is held in position by lock nuts 48 and 50.

Drive shaft 42 carries a gear wheel 52 and a clutch 54, a bearing assembly 56 being disposed between the drive shaft 42 and the gear wheel 52 so that the gear wheel 52 is only driven when the clutch 54 is engaged. Gear wheel 52 meshes with a cam gear wheel 58 on a control indexing shaft 60 and the cam gear wheel 58 meshes with a further cam gear wheel 62 on an indexing shaft 64 which is supported in bearing assemblies 66 and 68. A plate 70 which forms part of the Geneva mechanism is secured to the end of the indexing shaft 64 and a peg 72 extends at right angles to this plate 70. The peg 72 engages with another plate 74 of the Geneva mechanism which is secured to the control indexing shaft 60 and the arrangement is such that the plate 74 turns through 60° upon one complete revolution of the indexing shaft 64. The plate 74 is secured to the turret 10 as shown in FIGURE 4 so that the turret 10 is also indexed through 60°.

The control indexing shaft 60 is free to rotate relative to its cam gear wheel 58 and bearing liners 76 and 78 are disposed between the shaft 60 and the gear wheel 58. A gear wheel 80 is secured to the end of shaft 60, which gear wheel 80 meshes with a further gear wheel 82 the configuration of which is identical to gear wheel 80. Gear wheel 80 is mounted on a control operating shaft 84 which is supported in a bearing 86 disposed beneath the slide 16. The control operating shaft is provided at its other end with a further gear wheel 88 (see FIGURE 5) and a further bearing assembly 90. This further gear wheel 88 meshes with another gear wheel 92 on an intermediate shaft 94 which is supported beneath the slide 16 in a bearing assembly 96 and which is connected by means of a Hooke's joint 98 to a telescopic shaft (not shown) which is connected at its other end by means of a further Hooke's joint to a shaft in the machine tool control mechanism. Gear wheel 92 is of identical configuration to gear wheel 88 so that upon the plate 74 indexing through 60°, the control indexing shaft 60 is also indexed through 60° as is the shaft in the machine tool control mechanism.

Bearing assembly 68 of the indexing shaft 64 is held in position by lock nuts 100 and 102 and a cam 104 is mounted on the end of the shaft 64, this cam 104 is adapted to operate a micro-switch 106 (see FIGURE 5) mounted beneath the base 108 of the slide 16 to initiate the operation of the means for advancing or retracting the slide 16 along the slideway 18 and to de-energise the clutch 54 when the turret 10 has been indexed through 60°.

The cam gear wheel 62 on the indexing shaft 64 co-operates with a roller 110 secured to a plate 112 which in turn is secured to a turret locating plunger 114. The plate 112 is formed with a through aperture 116 in which a vertical guide member 118 is disposed. This vertical guide member 118 is secured to a plate 120 disposed beneath the slide 16 by means of a locating pin 122. The turret locating plunger is hollow and contains a helical spring 124 the end of which is located in a cap 126 and this spring 124 urges the plunger 114 upwardly to engage in a recess 128 on the underside of the turret 10. Bearing liners 130 and 132 are disposed in the apertures in the slide 16 through which the plunger 114 passes to reduce friction between the plunger 114 and the slide 16.

The cam gear wheel 58 on the control indexing shaft 60 co-operates with an engaging plunger 134 having a plate 136 secured to it, the plate 136 carrying a roller 138 and being formed with an aperture which receives a vertical guide 140. The engaging plunger 134 is hollow and contains a spring 142 which is held in position by means of an end cap 144.

The plunger 134 carries a yoke (not shown) having forked limbs which engage in a groove 143 in a sliding clutch member 145 mounted on the main drive shaft 42, the clutch member 145 being normally urged upwardly by the spring 142.

The turret 10 includes a central body portion 146 which is secured to the plate 74 and this central body portion 146 is provided with six equi-angularly disposed bearing assemblies 148. Each bearing assembly 148 supports a shaft 150 which is adapted to engage and to be driven by the main drive shaft 42 when the associated spindle 12 is indexed into the operative position in relation to the worktable 14 (it is to be noted that FIGURES 1 and 7 are taken from the opposite side of the machine to the other figures). Each shaft 150 has a gear wheel 152 mounted upon it and the gear wheels 152 are adapted to mesh with other gear wheels 154 there being one gear wheel 154 on each spindle 12. The gear ratio for each spindle is different so that for the same rate of rotation of the main drive shaft 42 different rates of roation of the spindles 12 are obtained.

Each shaft 150 carries a fixed clutch member 155 the arrangement being that the clutch member 155 of the shaft which is indexed into the operative position mates with the sliding clutch member 145. When indexing of the turret 10 is initiated the plunger 134 is moved downwardly by the cam gear 58 so as to effect disengagement of two clutch members 145 and 155. After completion of an indexing operation the plunger is moved upwardly under the action of spring 142 so that the sliding clutch member 145 engages the clutch member 155 of the next shaft 150.

Each shaft 150 is supported at its upper end in a bearing 156 in a cover 158 which is secured to the top of the turret 10. Each spindle 12 is contained within a housing 160 and these housings are secured to the side 162 of the turret by screws 164. The spindles are interchangeable i.e. any spindle can be removed by unscrewing the housing from the turret and then replaced in any other position so that a greater variety of speeds can be obtained than if each spindle had one particular position. Each spindle may be adapted to perform a different operation, for example, a drilling and tapping head such as that shown at 166 might be employed or alternatively a milling or boring head might be mounted on the turret head or alternatively a facing head unit might be employed.

The machine tool drive and change speed mechanism is shown in FIGURE 6 and includes an input shaft 168 driven from the electric motor 24 and an output shaft 170 which drives the main drive shaft 42 of the machine tool by means of a telescopic shaft which is connected by means of Hooke's joints at either end to the output shaft 170 and the main drive shaft 42. The change speed mechanism also includes a pair of intermediate shafts 172 and 174 which are supported in bearings 176, 178, 180 and 182. The input shaft 168 has a gear wheel 184 secured to it and this gear wheel 184 meshes with a gear wheel 186 fixed to the end of one of the intermediate shafts 172. A gear wheel 188 and clutch 190 are secured to the intermediate shaft 172 and a bearing assembly 192 is disposed between the gear wheel 188 and the shaft 172 so that the gear wheel is only driven when the clutch is engaged. This gear wheel 188 meshes with a gear wheel 194 fixed to the other intermediate shaft 174. A clutch 196, bearing assembly 198 and driving gear wheel 200 are secured to the other intermediate shaft 174 and when the clutch 196 is engaged the gear wheel 200 is driven by the shaft 174 to transmit drive to further gear wheel 202 on the output shaft 170, the output shaft 170 being supported in bearing assemblies 204 and 206. To the other end of the two intermediate shafts are further clutches 208 and 210, one on each intermediate shaft, intermeshing gear wheels 212 and 214 and a gear wheel 216 on intermediate shaft 174 which meshes with the gear wheel 202 on the output shaft 170.

Operation of the change speed mechanism is as follows:

When clutch 190 is engaged drive is transmitted via gear wheel 194 to the output shaft either via gear wheel 200 or gear wheel 216 depending upon whether clutch 196 or clutch 210 is engaged so that the output shaft 170 is driven at a first speed in either the forward or reverse direction. When clutch 208 is engaged and clutch 190 disengaged shaft 174 is driven from the shaft 172 via gear wheels 212 and 214. Gear wheel 212 is larger than gear wheel 214 so that an increased rate of rotation of shaft 174 is obtained as compared with the rate of rotation obtained when clutch 190 is engaged as in that case the gear wheel 188 on shaft 172 is much smaller than the gear wheel 194 on shaft 174. The output shaft is driven in either a forward or reverse direction depending upon whether clutch 196 or clutch 210 is engaged.

The mechanism for controlling the rate of feed of the slide 16 along the slideway 18 includes six hydraulic flow control valves 218 equi-angularly disposed about a valve shaft 220 and contained within a valve block 222. Oil is fed under pressure into an inlet port 224 in the valve block 222 and then passes into a circular groove 226 and through a pair of ports 228 and 230 to a central cavity 232 in the valve shaft 220. The valve shaft 220 also includes a port 234 which is adapted to be brought successively into alignment with the inlets 236 of the flow control valves 218 each of which includes a manually adjustable valve member 238 for varying the rate of flow of oil through the control valve to a second circular groove 240 in the valve block 222 and thence to an outlet port 242 which communicates with the feed side of the hydraulic piston and cylinder mechanism (not shown) for advancing the slide 16 along the slideway 18. To retract the slide 16 the oil is fed in the opposite direction.

Each indexed position of the turret 10 is related to the position of the valve shaft 220 which as hereinbefore described is driven by the control indexing shaft 60 and as each flow control valve 218 is separately adjustable the rate of advance of the turret 10 in each indexed position is also separately adjustable.

The valve shaft 220 carries a pair of gear wheels 244 and 246, one of which 244 is adapted to drive an identically dimensioned gear wheel 248 on a speed control shaft 250 and the other of which 246 is adapted to drive an identically dimensioned gear wheel 252 on a depth control shaft 254. The speed control shaft 250 carries six cam shafts 256 which are rotatable with the control shaft 250. Located in a fixed position relative to the outside diameter of the pack of cam shafts are a number of micro-switches 258. At each indexed position of the control shaft 250 one of the cam shafts 256 is positioned adjacent the micro-switches. Each individual cam shaft 256 includes an outer adjustable sleeve 260 on which a four position cam 262 is mounted and an inner control shaft 264 on which a three position cam 266 is mounted. The selection of the spindle speed is determined by the position of cam 262 which is effected by moving a knob 268 on the sleeve 260. Selection of the machine operating cycle is determined by the position of the cam 266 on the inner control shaft 264 which is adjusted upon movement of the knob 270. The cam 266 either operates a switch to effect the feed of the turret or a switch to stop the turret or, in the third position, operates a micro-switch which controls the electro-magnetic clutch 54 in the turret slide to allow the turret 10 to skip an indexing position.

The depth control mechanism includes a six position indexing tube or turret 272 which is internally splined and mounted on the shaft 254. At each position the tube 272 carries a number of longitudinally adjustable stop dogs 274, 276 and 278. Four micro-switches 280, 282, 284 and 286 are mounted in a pair of control boxes 288 and 290. Control box 290 is mounted on the slide 16 and control box 288 on the slideway 18. The four micro-switches 280–286 control the forward and reverse movement of the slide 16 and forward and reverse rotation of the spindles 12.

The stop dogs 274, 276 and 278, there being six of each, are individually adjustable longitudinally of the tube 272 and micro switch 280 is adapted to be operated by contacts 292 when the tube 272 is indexed through 60° upon corresponding indexing movement of shaft 220. Micro-switch 280 may be omitted if desired and the sequence of operation when the micro-switch 280 is omitted is as follows:

Switch 286 is depressed on return movement of the turret slide 18 and passes a signal which is stored in a control cabinet. Switch 284 passes a signal to a solenoid which operates a flow control valve which operates so as to include one of the hydraulic flow valves 218 in the circuit operating the piston of the slide 16 so as to reduce the forward rate of travel of the turret slide from a fast speed to a selected feed rate. Depression of micro-switch 282 passes a signal to the solenoid which then stops the feed of hydraulic fluid to the cylinder of the slide 16 to stop advancing movement of the turret 10 and slide 16 and reverses movement of the turret to rapid traverse.

With micro-switch 280 included depression of switch 286 on return movement of the turret slide 16 passes a signal which is stored in the control cabinet and depression of micro-switch 280 on indexing movement of the tube 272 passes a signal to the control cabinet to select a circuit in the electric control system. Depression of micro-switch 284 upon advancing movement of the slide 16 passes a signal to the solenoid to reduce the rate of advance of the slide 16 to the selected feed rate. Depression of micro-switch 282 passes a signal to the solenoid to stop advance of the slide 16 and reverse the slide at a selected feed rate. Simultaneously with reversal of movement of the slide 16 the electro-magnetic clutches in the change-speed mechanism are operated to reverse the direction of rotation of the spindle 12. Depression of micro-switch 284 on return movement of the turret slide 16 passes a signal to the solenoid to increase the rate of reversal of the slide to rapid traverse and also operates the clutches to return the direction of rotation of the spindle to that which previously obtained.

What we then claim is:
1. A machine tool which includes:
  (1) a base,
  (2) a substantially horizontal slideway on said base,
  (3) a slide reciprocable along said slideway,
  (4) an indexable turret mounted on and carried by said slide,
  (5) a plurality of tool-receiving spindles mounted on said turret,
  (6) the axes of the spindles being disposed substantially horizontally and each spindle being driven only when indexed into an operative position in relation to a work table,
  (7) means for indexing the turret relative to the slide about a substantially vertical axis,
  (8) locating means for angularly locating the turret relative to the slide in each of its indexed positions,
  (9) the locating means is de-actuated and the indexing means is actuated as a result of retracting movement of the slide away from the work table,
  (10) said locating means being re-actuated and the indexing means de-actuated after the turret has been indexed through a predetermined angle,
  (11) there being a driven shaft associated with each spindle and the driven shafts being brought successively into drive-transmitting relationship with a main drive shaft contained within the slide,
  (12) means being provided for controlling the distance and the rate of advance of the slide for each indexed position of the turret,
  (13) the means for controlling the rate of advance of the slide including a separate hydraulic flow valve for each spindle.
  (14) the hydraulic flow valves being radially and equi-angularly disposed in a fixed valve block which includes a central rotatable distributor shaft which is indexed upon indexing movement of the turret through the same angle as the turret.
2. A machine tool according to claim 1 in which means are provided for effecting manual adjustment of each hydraulic flow valve to obtain a predetermined rate of fluid flow via a groove in the valve block to the feed mechanism of the turret slide.

References Cited

UNITED STATES PATENTS

| 2,870,659 | 1/1959 | Burg | 77—25 |
| 2,682,698 | 7/1954 | Berthiez | 77—25 X |
| 2,303,243 | 11/1942 | Trythall | 77—25 |

FRANCIS S. HUSAR, *Primary Examiner.*

U.S. Cl. X.R.

29—40; 77—32.1

PO-1050
(5/69)

UNITED STATES PATENT OFFICE
CERTIFICATE OF CORRECTION

Patent No. 3,449,985      Dated June 17, 1969

Inventor(s) Dennis Robert Eaves, Horst Bergemann and William Gordon Groves Bishop It is certified that error appears in the above-identified patent and that said Letters Patent are hereby corrected as shown below:

Column 1, lines 5 & 6, the name of the assignee should read -- Bishop, Eaves & Sons Limited --

SIGNED AND
SEALED

NOV 25 1969

(SEAL)
Attest:

Edward M. Fletcher, Jr.
Attesting Officer

WILLIAM E. SCHUYLER, JR.
Commissioner of Patents